United States Patent [19]

Dunlop

[11] 3,994,849

[45] Nov. 30, 1976

[54] SOLID PAINTS

[75] Inventor: Alfred Norman Dunlop, Toronto, Canada

[73] Assignee: SCM (Canada) Limited, Don Mills, Canada

[22] Filed: Dec. 20, 1974

[21] Appl. No.: 534,827

[52] U.S. Cl. .................. 260/29.2 E; 260/29.2 EP; 260/29.2 UA; 260/29.6 TA; 260/29.6 SQ; 260/29.6 M; 260/29.6 MM; 260/29.6 PM; 260/29.6 AB; 260/29.6 MH; 260/29.6 N; 260/29.6 CM; 260/29.6 ME; 260/32.6 R; 260/33.4 R; 260/33.4 PQ; 260/33.6 UA; 260/33.6 PQ; 106/109
[51] Int. Cl.² .................... C08J 3/06; C08J 3/08
[58] Field of Search ............... 260/33.4 R, 33.4 PQ, 260/29.2 E, 29.2 EP, 29.2 UA, 22 TA, 29.6 SQ, 29.6 M, 29.6 MN, 29.6 PM, 29.6 AB, 29.6 MH, 29.6 N, 29.6 GM, 29.6 ME, 32.6 R, 33.6 PQ, 29.6 TA, 33.6 UA; 106/109

[56] References Cited
UNITED STATES PATENTS

| | | | |
|---|---|---|---|
| 2,462,018 | 2/1949 | Wood | 106/109 |
| 2,987,493 | 6/1961 | Grady et al. | 260/884 |
| 3,110,690 | 11/1963 | Friedsam | 260/22 T |
| 3,392,129 | 7/1968 | Hoy et al. | 260/22 T |

*Primary Examiner*—J. Ziegler
*Attorney, Agent, or Firm*—Merton H. Douthitt; A. Joseph Gibbons

[57] ABSTRACT

Solid paint compositions having dimensional stability based on ion bonding are formed by interaction of certain polymers, having acid group functionality and dissolved in non-polar solvents, with a substantial excess in the order of 100-600 mole percent of a crosslinking reactant formed by solution of a metal hydroxide, ammonium hydroxide or cation former in a polar solvent of dielectric strength greater than 10.

14 Claims, No Drawings

SOLID PAINTS

BACKGROUND OF THE INVENTION

The present invention relates to a new type of paint product, namely, a solid paint having dimensional stability based on ion bonding.

Various resin compositions consisting of homopolymers and co-polymers having partially neutralized carboxylic acid groups are known. These contain between 3% and 20% of carboxylic acid residues of which less than 50 percent of the carboxylic acid groups are neutralized with mono-valent, divalent or trivalent cations. The prior art resins, known as Ionomers, are desirable in industry because they combine the utility of a thermoset polymer with the mobility and workability of the thermoplastic resin. Ionomers have lower densities than vinyl or cellulosic plastics and because of their similarity to polyethylenes find use as protective films in the food packaging industry. Ethylene-methacrylic acid co-polymers are discussed in U.S. Pat. Nos. 3,266,272; 3,338,739; and in Belgium Pat. Nos. 674,595 and 600,397. Ethylene-sodium acrylate co-polymers are described in Netherlands Pat. No. 6,511,920. Many of the desirable properties of these polymers such as stress-crack resistance, transparency, grease and abrasion resistance, low permeability, high elongation, high tensile strength, and low modulus are attributed in part to a type of ionic bonding.

It has now been discovered that solid paints having effective gel properties necessary to provide dimensional stability can be prepared by cross-linking certain reactive polymers with "ion clusters" having polar molecule components. This type of ion bonding differs substantially from the solvent-free ionic bonding of the prior art compounds.

BRIEF SUMMARY OF THE INVENTION

One object of the present invention is to provide a solid paint composition having dimensional stability based on ion bonding, i.e., ion cluster cross-linking of polymers, comprising the admixture of:
a. a solution of a curable polymer having a molecular weight ranging from 1,000 to 7,000 and sufficient reactive acid functional groups selected from the group consisting of carboxylic, sulfonic and phosphonic to provide an acid number from 20 to 80, said resin dissolved in a non-polar solvent to provide a 25 to 90 weight percent solution;
b. a solution of a metal hyroxide in a polar solvent of high dielectric strength to provide a 10-50 weight percent solution, said metal hydroxide selected from the group consisting of sodium, potassium, lithium, barium, calcium, manganese and magnesium.
c. a metallic drier in amounts from about 0.5 to 5 weight percent based on the total weight of polymer; wherein said composition contains from about 100 to 500 mole percent of metal hydroxide per mole of acid functional group.

An additional object is to provide a process for preparing a solid paint having dimensional stability based on ion bonding and a gel strength from about 100 to 190 millimeter penetration which comprises:
a. dissolving a resin having pendant or terminal reactive acid groups selected from the group consisting of carboxylic, sulfonic and phosphonic in a non-polar hydrocarbon solvent to provide a solution having 25 to 90 weight percent resin, said resin having an acid value in the range of from 20 to 100;
b. mixing pigments, fillers, colorants and 0.5 to 5 weight percent of an organic acid metal salt drier into the resin solution;
c. adding thereto under vigorous stirring a 20 to 30 weight percent solution of metal hydroxide in a $C_{1-8}$ aliphatic alcohol containing 100 to 600 mole percent of the amount of metal hydroxide required to neutralize said reactive acid groups of the resin;
d. ageing the mixture for 3 to 25 hours at a temperature between 15° and 70° centigrade.

A further object is to provide paint sticks or bars based on the above compositions and processes.

DETAILED DESCRIPTION

Solid paint compositions having dimensional stability and desirable paint characteristics result from the interaction of certain polymers, having reactive functional groups, dissolved in a non-polar solvent, and cross-linking agents formed by dissolving a metal hydroxide in a high dielectric polar solvent. Cross-linking of the polymer chains takes place through "ion clusters" composed of multiple ions associated with polar solvent molecules. By the term solid paint is meant a paint which has sufficient dimensional stability under storage conditions, i.e. is self-supporting, yet could be utilized as a stick of paint (analogous to a segment of hard butter or cheese). Such a solid paint can advantageously be applied by hand to the surface usually protected by paint and coating products without the use of a brush or roller. For practical and protective purposes, such stick of paint is contained in a skin or covering suitable for storage. Advantageously such protective cover will have a closeable opening, said covering being distinct from the nature of an applicator in the usual sense. The solid paint can be used by placing the paint stick in contact with the surface to be painted followed by the usual vertical and lateral movements across the substrate whereby a non-sagging, air-curable paint film is deposited thereon. The shear provided by drawing the paint stick over the surface to be painted is sufficient to cause the solid paint to deform to a flowable coating at the point of contact. Such a solid paint coating is one that possesses the desirable properties of adhesion, flow and uniform coverage of the surface. It is assumed that the solid paint of the present invention will contain the usual pigments, fillers, driers, bonding agents, and other additives to provide films having desirable properties of gloss, color, and hiding power. It is anticipated that such a solid paint could be fabricated in blocks or sticks having widths ranging from ⅛ inch to about 8 feet or larger, thus, also allowing use in industrial applications such as, for example, coil coating of metal.

The resins useful in the present invention include homopolymers and co-polymers and mixtures thereof having appropriate functional groups either built into the polymer chain or grafted thereto by the usual graft techniques. Useful resins include but are not limited to polyethers, polyesters, unsaturated polyesters, polyurethanes, polyolefins, polyacrylates, polyhydrocarbons derived from aliphatic and aromatic hydrocarbons having $\alpha,\beta$-unsaturation, vinyl resins and chlorine-substituted vinyls as well as other combinations known to the art. The particular reactants and quantities are chosen to produce resins having pendant and/or terminal functional substituents which are capable of further reaction with ionic reagents to form gels of proper dimensional stability and gel strength. Desirable application properties result when the gel strength is from about 100 to 190 and preferably from 135 to 180 when measured 25 hours after gelling. Gel strength is recorded in millimeter units using a Universal Penetrometer-the lower the penetrometer reading, the higher the gel strength.

Regardless of the type of resin used in the practice of this invention, it is essential that the particular resin be soluble in a non-polar solvent and that the resin have pendant and/or terminal functional reactive groups which are readily ionizable. Such ionizable groups include both cationic and anionic reactive functions. Preferably, anionic functional groups used to modify the resin are the sulfonic, phosphonic and carboxylic types. The carboxylic acid functionality is especially preferred since a variety of polymers having such reactive ionizable groups can be readily purchased or synthesized. Preferred reaction products are those obtained from the combination of carboxylic acid substituted polyesters and alkyd polyesters having molecular weights in the range of from about 1000 to 7000 which contain from about 1 to 4 reactive functional groups per each 2,000 unit of molecular weight. Polyesters and polyethers having molecular weights in the range of 400–2000 and which yield solid paints of desirable gel properties are especially preferred. Alkyd resins modified with fatty acid groups and having terminal carboxylic functionality are exemplified in the best mode Examples. In the case of polyolefins, polyacrylates and other systems where no air-curing will occur, a higher molecular weight of the order of 100,000 is usually necessary. However, 1 to 4 reactive functional groups are still required per 2,000 unit of molecular weight. The alkyd resins useful in the practice of this invention are prepared by polymerizing the polymer monomers and other intermediates in a fusion cook at a temperature of about 400°–600° F. to yield resins having an acid value (A.V.) ranging from 35 to 55 and preferably 41 ± 2. Certain 'longer' oil resins as exemplified hereafter in Examples 1 and 2 are polymerized at 450° F. to an A.V. of 43.0.

The above described polymers having ionizable reactive groups are dissolved in sufficient non-polar solvents to provide solutions having non-volatile (N.V.) contents of from about 10 to 90 and preferably from 35 to 60 weight percent. Especially preferred are solutions of 50% N.V. Suitable non-polar solvents for dissolving the polymer include both aromatic and aliphatic-type hydrocarbons and are selected based on the particular resin used, the functionality on said resin, and the nature of the ionic reactant. In general, suitable solvents are hydrocarbons having a boiling point of about 125 to 400° F. and which contain up to twelve carbon atoms. These include hexane, heptane, octane, nonane, decane and mixtures thereof. Preferred hydrocarbons are the various octanes because of their suitable evaporation rates. Mineral spirits is an especially preferred solvent because of its availability and the desirable properties of the resultant solid paint. In certain cases aromatic hydrocarbons such as toluene and xylene can advantageously be used and are especially valuable in dissolving the higher molecular polymers.

It is understood that the solvent, resin and proportions of each will vary and depend on the type of resins, the type of solvent, the fillers and other additives needed for a particular end-product solid paint. The additives, driers and other usual dispersant aids can be blended with the resin solution using a Cowles agitator. The order of addition is usually not critical. If desired, the pigments and other additives may be blended with the resin material prior to the solution of the resin in the non-polar solvent. After the additives are thoroughly mixed, the resulting composition is usually allowed to age for 12 to 20 hours before reacting with the ionic component. The above resin formulations (solution of polymer in a non-polar hydrocabon) are next combined with the ionic cross-linking agents dissolved in a high dielectric polar solvent.

Suitable ionic cross-linking reactants are usually of the inorganic salt variety which produce on solution specific cations or anions capable of combining with the terminal reactive groups of the resin to form ion clusters responsible for gel formation. Such clusters, which contain the high dielectric polar solvent molecules, act as reversible cross-links to join the reactive resin molecules in webs thus imparting gel strength and dimensional stability to the resultant solid paint. When the reactive terminal sites on the polymer are carboxylic acid groups (—COOH), the preferred cross-linking reactants are alcoholic solutions of mono, di and trivalent metal hydroxides. Such cross-linking reactants include the oxides and hydroxides of sodium, potassium, lithium, barium, calcium, manganese and magnesium. Equally effective cross-linking agents are the corresponding metal alkoxides i.e. sodium methylate. In some cases ammonium hydroxide and organic cation formers such as tetramethylammonium hydroxide can be used as cross-linking reactants. The cross-linking gelation derived by reacting sodium hydroxide with polyester and alkyd resin molecules having terminal or pendant carboxyl groups is especially preferred. Suitable gels result when an effective amount of the cationic base combines with the free carboxylic acid functionality. In every case an amount of base substantially in excess of the amount required for neutralization is necessary to be effective. By substantial excess is meant from about 100–600 mole percent of ionic reactant dissolved in the polar solvent. Although the amount of excess varies with each particular resin system and depends upon the molecular weight of the resin, the number and type of the ionizable functional group and on the valence of the metal hydroxide, satisfactory gels result when the ionic reagent is used at 100-600 mole percent excess. When amounts less than 100 mole percent are used the resins do not exhibit the required dimensional stability. When amounts greater than 600 mole percent are used the resins do not exhibit the desired flow and surface characteristics. For gel formation the metal hydroxide or other ionic cross-linking reactant is added as a 10–50 weight percent solution in the high dielectric polar solvent to the polymer resin dissolved in the non-polar hydrocarbon. Preferred solid paints were obtained by using 100 to 250 mole percent sodium hydroxide based on the molar content of the reactive functional group i.e. moles free COOH.

The polar solvents used in dissolving the ionic cross-linking agents are generally those solvents having a dielectric constant greater than 10, include aliphatic alcohols containing one to ten carbon atoms and one to two hydroxy groups. Although $C_{1-8}$ aliphatic alcohols are usually preferred, glycols containing the similar carbon chains are sometimes useful in producing desirable gel properties in the resultant solid paint. Useful alcohols include methanol, ethanol, isopropanol, n- propanol, the normal and isomeric butanols, pentanols, hexanols, heptanols, octanols, as well as the corresponding glycols derived therefrom. Methanol is the preferred alcohol because of its costs, availability, and the favorable solubility of the ionic reagents therein. In certain applications it is preferred to use glycols or mixtures of glycols and alcohols as the plasticizer carrier for the ionic reactant. Preferred glycols are ethylene glycol and propylene glycol although for certain resins the higher glycols such as pentanediol and hexanediol act in the nature of a plasticizer and provide desirable lubricity. Additional high dielectric polar solvents useful in the practice of this invention include, water, formamide, dimethylformamide, and dimethylsulfoxide.

The metal driers suitable for the instant solid paint compositions are those known to the art and include the metal salts and/or esters of various organic carboxylic acids containing up to 30 carbon atoms and mixtures thereof. The metal salts of cobalt, zinc, zirconium, magnesium, aluminum and manganese prepared from branched chain $C_{8-12}$ carboxylic acids are preferred driers. The typical paint formulations, as described herein, required unusually high amounts of metal drier of the order of about 0.5 to 5 percent based on the weight of the resin. The amount of drier needed depends to some extent on the oil or other source of double bonds used in the paint system i.e. number and type of double bonds available.

A further aspect of this invention includes the use of resins having pendant and/or terminal functional reactive groups other than the acid or carboxylate groups. When the ionizable group on the polymer is a cationic group precursor instead of an acid or carboxylate group, the ionic cross-linking reactant will be an anion precursor. Examples of cation formers are (1) primary, secondary, tertiary and cyclic amines, which react with hydrogen and hydrocarbon halides to give quaternary salts; (2) substituted phosphines which combine with halides to give phosphonium salts; (3) sulfides which react with alkyl halides give sulfonium salts; (4) cyclic ethers which react with acids give oxonium salts. Examples of anion source cross-linking agents include acetic acid, nitric acid, hydrochloric acid, sulfuric acid, and relatively short chain organic multibasic acids such as oxalic, malic, succinic, maleic, adipic acids and corresponding anhydrides.

The following specific examples illustrate only a limited number of embodiments; accordingly, the invention is not limited thereto. All parts and percentages being by weight unless otherwise indicated. The driers used were commercially available conventional driers. The "mineral spirits" and the 'odorless mineral spirits' had a boiling range of 300°–400° F. and 345°–410° F., respectively. Molecular weights reported are number average molecular weights unless otherwise specified.

EXAMPLE 1

Resin A was prepared by polymerizing a mixture (in amounts shown below) of trimethylolethane (TME), dehydrated castor fatty acid (DCOFA), Azelaic dimer acid (AZELAIC 1110) and dimer acid (EMPOL 1014) at 460° F. as a fusion cook to an acid value of 41 (41 ± 2 normal range).

Resin B, a 'longer' oil resin, was prepared in a fashion similar to Resin A by polymerizing at 450° F. to an acid value of 42.0.

Resin C, prepared using Pentaerythritol (PE) in place of trimethylolethane (TME), was polymerized at 460° F. to an acid value of 42.0.

Resin D, prepared using a combination of DCOFA and Tung Oil instead of simply DCOFA, was polymerized at 460° F. to an acid value of 43.0.

TABLE I

|  | Material | Mols | Wt. | Acid Value |
|---|---|---|---|---|
| Resin A | TME | 2.46 | 295 | 41 |
|  | DCOFA | 2.46 | 690 |  |
|  | AZELAIC 1110 | 1.78 | 340 |  |
|  | EMPOL 1014 | 0.74 | 423 |  |
| Resin B | TME | 2.0 | 240 | 43 |
|  | DCOFA | 2.4 | 672 |  |
|  | AZELAIC 1110 | 1.42 | 270 |  |
|  | EMPOL 1014 | 0.59 | 337 |  |
| Resin C | PE | 1.0 | 136 | 42 |
|  | DCOFA | 2.0 | 560 |  |
|  | AZELAIC 1110 | 0.72 | 135 |  |
|  | EMPOL 1014 | 0.29 | 168 |  |
| Resin D | TME | 1.0 | 120 | 43 |
|  | DCOFA | 0.6 | 168 |  |
|  | TUNG OIL | 0.19 | 168.5 |  |
|  | AZELAIC 1110 | 0.48 | 91.6 |  |
|  | EMPOL 1014 | 0.97 | 555 |  |

EXAMPLE 2

The polyester Resin A (25 parts) was formulated into a hydrocarbon solution by mixing with 12 parts tung Oil, 13 parts mineral spirits, 2.0 parts of a cobalt drier (12.0 percent metal), 2.0 parts manganese drier (9.0 percent metal) and 3.5 parts zirconium drier (12.0 percent metal) and the resultant composition was allowed to mature at room temperature for 16 hours. Titanium dioxide (40 parts) and calcium carbonate (10 parts) were blended with the resin solution under Cowles agitation to yield a No. 6 Hegman grind. Various weights of sodium hydroxide were then added as a 25 weight percent solution in methyl alcohol to form the solid paints identified in Table II. Solid Paint 2A exhibited a streaky film appearance, the paint was slightly too hard requiring too much effort to apply i.e. exhibited too much drag on application, and application characteristics which were too hard. The solid paints 2B and 2C with gel strength of 147 and 161 respectively exhibited satisfactory application characteristics and film appearance i.e. the paint didn't require too much force to apply and the resultant film was uniform. All three solid paints exhibited dimensional stability and gave a satisfactory dry coating on application to a test panel surface.

TABLE II

| Exp. No. | Resin | Parts NaOH Added | Percent Neutralization Calculated on Moles Carboxylic Acid | Gel Strength* (24 hours) |
|---|---|---|---|---|
| 2A | A | 6.65 | 225 | 119 |
| 2B | A | 6.35 | 215 | 147 |
| 2C | A | 6.05 | 205 | 161 |
| 3A | C | 7.2 | 240 | 160 |

TABLE II-continued

| Exp. No. | Resin | Parts NaOH Added | Percent Neutralization Calculated on Moles Carboxylic Acid | Gel Strength* (24 hours) |
|---|---|---|---|---|
| 3B | C | 7.2 | 240 | 155 |
| 3C | C | 6.0 | 200 | 178 |
| 4A | C | 4.75 | 160 | 176 |
| 4B | C | 5.0 | 170 | 138 |
| 8A | C | 6.1 | 200 | 165 |
| 8B | C | 6.5 | 220 | 155 |

*Average of three determinations

EXAMPLE 3

Resin C was formulated into paints 3A and 3B using the procedure outlined in Example 2 and the same relative amounts of resin, tung oil, mineral spirits, cobalt drier, manganese drier, zirconium drier, titanium dioxide, and calcium carbonate. A third paint formulation 3C was similarly prepared from Resin C but contained 1.3 parts of cobalt drier (12% metal), 0.5 parts manganese drier (9.0% metal), 3.0 parts zirconium drier (12% metal) and 0.19 parts aluminum stearate. The solid paints formed on the addition of 25% methanolic sodium hydroxide identified as 3A, 3B and 3C each exhibited satisfactory gel strengths, application characteristics, film appearance and drying quality.

EXAMPLE 4

Polyester Resin C (25 parts) was formulated into a hydrocarbon solution by mixing with 12 parts tung oil, 13 parts mineral spirits, 0.95 parts cobalt drier and 2.1 parts zinc drier (16 percent metal). A second resin formulation for Resin C was identical to the above except it contained only 0.9 parts of cobalt drier and additionally contained 0.45 parts of manganese drier. These resins and paints made therefrom which contained 50 parts titanium dioxide and no calcium carbonate are identified respectively as 4A and 4B in Table II. It is seen that paints 4A and 4B with neutralization values of 160 and 170 exhibit gel strengths of 176 and 138 respectively. The application characteristics of 4A were slightly inferior the solid paint tended to be too soft. The film appearance and drying quality of both paints were acceptable.

EXAMPLE 5

Repeating the experiments 2A, 2B, 3A, 3B and 3C but adding the driers subsequent to the addition of pigment to the resin will result in essentially similar acceptable gel strengths, application characteristics and drying rates.

EXAMPLE 6

Paint blocks of approximate size 4 × 6 inches were stored using a thin polyethylene envelope for a period of nine months. Application of these paints to a test panel after the storage period showed no detectable deterioration of the application and film characteristics. Additionally, solid paints prepared from the same resins but having acid values in the range of from 30 to 60 gave acceptable solid paint characteristics. Equally good results were obtained when oiticica oil or safflower oil was used instead of dehydrated castor oil. The best application properties were obtained when the gel strength as measured by the Universal penetrometer was between 145 and 180 mm. Gel strengths of from 100 to 145 and 180–190 gave effective solid paints with somewhat less desirable characteristics.

EXAMPLE 7

Resin D was prepared by first esterifying the dehydrated castor fatty acid (168 parts) with trimethylolethane (120 parts) at a temperature ranging up to 480° F. to yield a product of acid value 4.0. Thereafter an ester exchange was effected by further reaction with tung oil (168.5) in the presence of 2.0 parts of litharge catalyst until the product was completely miscible in methanol. The resulting product was combined with Azelaic 1110 (91.6 parts) and Empol 1014 (555 parts) and cooked to an acid value of 43.0. The resulting resin had an approximate molecular weight of 1300.

A cationic Resin E was prepared by condensing Resin D (1040.4 parts) with N,N-diethylaminoethanol in the presence of litharge (2.0 parts) catalyst using reaction conditions such that the predominant reaction was esterification rather than amide formation. After removal of water and excess N,N-diethylaminoethanol, Resin E had a molecular weight of 1500.

Gelation of Resin E was effected by neutralizing (100 and 300%) a 50/50 weight percent solution of Resin E in mineral spirits with 37% hydrochloric acid. The resultant solid paints had properties inferior to those of a corresponding gel neutralized to 200 percent with 32 N-sulfuric acid and resulting in gel strengths of from 100–150.

EXAMPLE 8

Polyester resin C (25 parts) was formulated into a hydrogen solution by mixing with 12 parts tung Oil, 13 parts mineral spirits, 0.6 parts cobalt drier (12.0 percent metal), 0.6 parts manganese drier (9.0 percent metal) and 6.0 parts zirconium drier (12.0 percent metal) and the resultant composition was allowed to mature at room temperature for 16 hours. Titanium dioxide (40 parts) and calcium carbonate (10 parts) were blended with the resin solution under Cowles agitation to yield a No. 6 Hegman grind. Various weights of sodium hydroxide were then added as a 25 weight percent solution in methanol under reduced pressure in a 'vacuum Cowles' to form a solid paint (Table II). This manner of addition diminishes the chance of entrapping air into the 'final' solid paint. Paints 8A and 8B (of Table II) exhibited superior film appearance and application properties. Both paints were dimensionally stable and exhibited good dry on application to a test panel surface.

EXAMPLE 9

Resin F was prepared under free radical conditions as follows: 10 parts methacrylic acid, 90 parts lauryl methacrylate, 1 parts Bis (4-t-butylcyclohexyl) peroxycarbonate (initiator), and 300 parts mineral spirits were added to the kettle. Polymerization was accomplished by heating to 60° C. and holding at this temperature for 2 hours while the mass in the kettle was being agitated. Conversion of 99% was achieved; acid value of the polymer was 65.0. Approximately 100 parts of the mineral spirits were removed by vacuum distillation.

Various weights of sodium hydroxide were added as a 25 weight percent solution in methanol to 75 parts of the 33 percent N/V resin with agitation as shown:

| Exp. No. | Parts NaOH Added | Percent Neutralization Calculated On Carboxylic Acid |
|---|---|---|
| A | 6.9 | 150 |
| B | 9.2 | 200 |

The two 'clear' paints can be described as follows: Experiment A resulted in a product that was just barely dimensionally stable and exhibited poor application characteristis, i.e. on applying the paint laid down too thick a film and too much force (relative to the previous examples) was required to draw the sample across the test panel.

Experiment B resulted in a stronger product that exhibited good dimensional stability (gel strength of approximately 160 mm penetration) and good application characteristics. Paint B exhibited very little drag on application. Both these products resulted in 'dry' film on the test panel.

EXAMPLE 10

Resin G, a 100 percent N/V dicarboxypolybutadiene having a molecular weight of 1410 and an acid value of 65.0, was formulated into the following solid paint systems:

| Exp. No. | A | B | C | D |
|---|---|---|---|---|
| Resin G (parts) | 50 | 50 | 50 | 17 |
| Resin A | — | — | — | 33 |
| Mineral spirits | 50 | 50 | 50 | 50 |
| Cobalt drier (12 percent metal) | .5 | .5 | .5 | .5 |
| Zirconium drier (12 percent metal) | 1.7 | 1.7 | 1.7 | 1.7 |
| Titanium dioxide | — | 130 | 110 | 90 |
| Calcium carbonate | — | 70 | 50 | 40 |
| NaOH (25 parts in methanol) | 18.0 | 20.2 | 36 | 24 |
| Percent Neutralization | 200 | 300 | 400 | 350 |
| Gel Strength (mm.) | 250 | 180 | 110 | 160 |

Paint A having a gel strength of 250 did not exhibit dimensional stability. Paints B, C and D were dimensionally stable. Under application action Paint B tended to put down too thick a film and was a little too elastic, i.e. tended to be slightly taffy like. Paint C was too hard and for this reason it resulted in poor quality application. Paint D exhibited dimensional stability and acceptable application. All the paints resulted in a dry film on the test panel.

What is claimed is:

1. A solid paint composition having dimensional stability based on ion bonding comprising the admixture of:
   a. a solution of a curable polymer resin having a molecular weight ranging from 1,000 to 7,000 and sufficient reactive acid functional groups selected from the group consisting of carboxylic, sulfonic and phosphonic to provide an acid number from 20 to 80, said resin dissolved in a non-polar solvent to provide a 25 to 90 weight percent solution;
   b. a solution or suspension of a metal hydroxide, ammonium hydroxide or organic cation former in a polar solvent of dielectric strength greater than 10 to provide a 10–50 weight percent solution, said metal hydroxide selected from the group consisting of sodium, potassium, lithium, barium, calcium, manganese and magnesium;
   c. a metallic drier in amounts from about 0.5 to 5 weight percent based on the total weight of polymer;
wherein said composition contains metal hydroxide, ammonium hydroxide, or organic cation former in excess of, from 100 to 600 mole percent, the amount required to neutralize said reactive acid group of the resin.

2. The composition of claim 1 wherein the polar solvent is selected from the group consisting of a $C_{1-8}$ aliphatic alcohol, formamide and water, the metal hydroxide is sodium hydroxide, and the functional group is a carboxylic acid group.

3. The composition of claim 2 wherein the aliphatic alcohol is methanol.

4. The composition of claim 2 wherein the resin is a polyester resin.

5. The composition of claim 2 wherein the resin is an alkyd resin.

6. The composition of claim 4 wherein the polyester resin having a molecular weight of 1500–3500 and acid number 38–48 is dissolved in mineral spirits and the sodium hydroxide is present at 220–280 mole percent.

7. The composition of claim 2 having from 1 to 3 weight percent of organic acid metal salt drier, said metal being selected from the group consisting of cobalt, zinc, magnesium, aluminum, manganese and zirconium.

8. A process for preparing a solid paint having dimensional stability based on ion bonding and a gel strength from about 100 to 190 which comprises:
   a. dissolving a resin having pendant or terminal reactive acid groups selected from the group consisting of carboxylic, sulfonic and phosphonic in a non-polar hydrocarbon solvent in the range of 25 to 90 weight percent, said resin having an acid value in the range of from 20 to 100;
   b. mixing pigments, fillers, colorants and 0.5 to 5 weight percent of an organic acid metal salt drier into the resin solution;
   c. adding thereto under vigorous stirring a 20 to 30 weight percent solution of suspension of metal hydroxide, ammonium hydroxide, or organic cation former in a $C_{1-8}$ aliphatic alcohol containing in excess of, from 100 to 600 mole percent, the amount required to neutralize said reactive acid group of the resin.

9. The process of claim 8 wherein the resin is a homopolymer or copolymer selected from the group consisting of alkyd resin, polyester, unsaturated polyester, polyolefin, polystyrene, polyvinylchloride, polymethacrylate, polyacrylate, or mixtures thereof, wherein said reactive acid group is a carboxylic acid group.

10. The process of claim 9 wherein 210–250 mole percent of a 25 weight percent solution of sodium hydroxide in methanol is combined with a polyester resin.

11. The process of claim 10 wherein the resin is an alkyd resin having a molecular weight of 1500 to 3500 and an acid number of from 38 to 48.

12. A solid paint prepared according to claim 8.

13. A solid paint prepared according to claim 11.

14. A paint stick which comprises the solid paint of claim 12 encased in a removable skin.

* * * * *

UNITED STATES PATENT AND TRADEMARK OFFICE
CERTIFICATE OF CORRECTION

PATENT NO. : 3,994,849
DATED : November 30, 1976
INVENTOR(S) : Alfred Norman Dunlop It is certified that error appears in the above–identified patent and that said Letters Patent are hereby corrected as shown below:

Column 1, line 51, "hyroxide" should be deleted and --hydroxide-- should be inserted.

Column 8, line 45, "hydrogen" should be deleted and --hydrocarbon-- should be inserted.

Column 9, line 22, "characteristis" should be deleted and --characteristics-- should be inserted.

Signed and Sealed this

Eighth Day of March 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,994,849
DATED : November 30, 1976
INVENTOR(S) : Alfred Norman Dunlop It is certified that error appears in the above-identified patent and that said Letters Patent are hereby corrected as shown below:

Delete the word "millimeter" or its abbreviation "mm" at each of the following locations:

Col. 1, line 64: delete the word "millimeter".

Col. 3, line 6: delete the word "millimeter".

Col. 7, line 68: delete the abbreviation "mm".

Col. 9, line 27: following the number 160, delete "mm".

Col. 9, line 50: following the words "Gel Strength" delete " (mm.) ".

Signed and Sealed this

Twenty-eighth Day of April 1981

[SEAL]

Attest:

RENE D. TEGTMEYER

Attesting Officer     Acting Commissioner of Patents and Trademarks